United States Patent

[11] 3,584,310

[72] Inventors Eric L. Hochfelder
Old Bridge;
Henry Mann, Holmdel, both of, N.J.

[21] Appl. No. 787,374
[22] Filed Dec. 27, 1968
[45] Patented June 8, 1971
[73] Assignee Bell Telephone Laboratories, Incorporated
Murray Hill, Berkeley Heights, N.J.

[54] SIGNAL RESHAPER
9 Claims, 2 Drawing Figs.

[52] U.S. Cl. .......... 328/164, 307/235, 307/268, 328/117, 328/171
[51] Int. Cl. .......... H03k 5/00, H04b 15/00
[50] Field of Search .......... 328/115.7, 164, 171; 307/235, 268

[56] References Cited

UNITED STATES PATENTS

| | | | |
|---|---|---|---|
| 2,446,613 | 8/1948 | Shapiro .......... | 328/164X |
| 3,076,145 | 1/1963 | Copeland et al. .......... | 328/165 |
| 3,128,435 | 4/1964 | Mleczko et al. .......... | 328/115 |
| 3,500,073 | 3/1970 | Salaman .......... | 328/117X |

*Primary Examiner*—Stanley D. Miller, Jr.
*Assistant Examiner*—John Zazworsky
*Attorneys*—R. J. Guenther and James Warren Falk

ABSTRACT: A pulse reshaper includes a comparator to which an input pulse is coupled through two separate paths. One path applies the input pulse directly to the comparator. The other path delays and shifts the voltage levels of the input pulse. The comparator changes state at each polarity reversal of the difference between the two path signals and provides a reshaped output signal.

INVENTORS E.L. HOCHFELDER
H. MANN
BY J. S. Cubert
ATTORNEY

SIGNAL RESHAPER

BACKGROUND OF THE INVENTION

Our invention is related to signaling arrangements and more particularly to circuits useful in reshaping and detecting pulse signals.

In communications and related systems, transmission paths over which pulse signals are sent often cause pulse distortion. Generally, reshaping with respect to amplitude and pulse transitions is required before such pulse signals can be used by a connected utilization device. The reshaping circuit provides an output pulse having well defined signal transitions and standard voltage levels.

One type of reshaper circuit known in the art utilizes a threshold point set at half the signal amplitude of the expected incoming pulse signal. The gain of the circuit is arranged to provide rapid transitions every time the incoming pulse signal passes through the predetermined threshold point. If, however, the slopes of pulse transitions vary from pulse to pulse or from edge to edge of the same pulse, the reshaped output can have a different duration than the originally transmitted pulse. This results in a modification of the pulse signal that can seriously affect the operation of a connected utilization device.

Another type of pulse reshaping circuit known in the art utilizes a differentiation arrangement from which a narrow signal is obtained at each transition of an incoming pulse signal. The narrow pulse may be used to trigger a pulse generator which then generates an output pulse signal having rapid transitions and standard voltage levels. The differentiator arrangement however passes all transitionlike input signals including noise. This may result in spurious output pulses and erroneous operation of any connected utilization device. The variations in slope or amplitude of the incoming pulse signal may also cause variations in the timing of the output pulses from the differentiator circuit so that the pulse duration of the reshaper output signal may be substantially different from that of the incoming pulse signal.

BRIEF SUMMARY OF THE INVENTION

Our invention is a circuit for reshaping distorted incoming pulse signals that includes a comparator to which an input pulse signal is coupled through two separate paths. One path applies the input pulse directly to a first input terminal of the comparator. The other path includes a delay and a diode network to offset the voltage levels of the delayed input pulse from the directly coupled pulse. The offset voltage levels of the delayed pulse provide threshold voltages close to the directly applied pulse voltage levels. The delayed offset voltage pulse is applied to the second input terminal of the comparator. The comparator changes state at each polarity reversal of the difference between the signals applied to its input terminals whereby a reshaped output pulse is generated.

In an illustrative embodiment of our invention the diode network includes a pair of oppositely poled shunt-connected diodes that are biased to a voltage between the incoming pulse voltage levels. One diode offsets the lower voltage level in the positive direction, and the other diode offsets the higher voltage level in the negative direction. The directly coupled input pulse and the delayed and offset input pulse are applied to a high gain differential amplifier wherein the two pulses are compared. Each positive going reversal in the difference signal applied to the amplifier causes the amplifier output to be saturated to a predetermined high voltage level and each negative going polarity reversal causes the amplifier output to be saturated to a predetermined low voltage level. The offset voltage introduced by the oppositely poled shunt-connected diodes provides two threshold points close in value to the incoming pulse voltage levels so that the amplifier output pulse duration is the same as that of the incoming pulse and is substantially independent of the variations in slope and amplitude of the input pulse.

DETAILED DESCRIPTION

Figure 1:
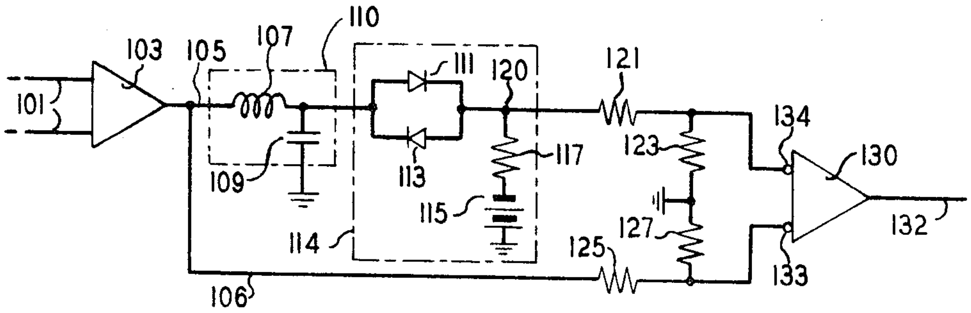
FIG. 1 depicts a circuit illustrative of our invention.

Referring to FIG. 1, an incoming pulse signal having two voltage levels is applied to amplifier 103 from transmission line 101. This incoming signal is linearly amplified in amplifier 103 and is coupled therefrom via conducting path 106 and resistor 125 to input terminal 133 of differentiator amplifier 130. The pulse signal from amplifier 103 is coupled through a second path 105 to input terminal 134 of amplifier 130. The second path includes delay 110, diode network 114 including oppositely poled and shunt-connected diodes 111 and 113, and resistor 121. Diodes 111 and 113 are biased to a reference voltage which is set between the voltage levels of the pulse signal from amplifier 103 by means of resistor 117, resistor 121, resistor 123, and voltage source 115.

Figure 2:
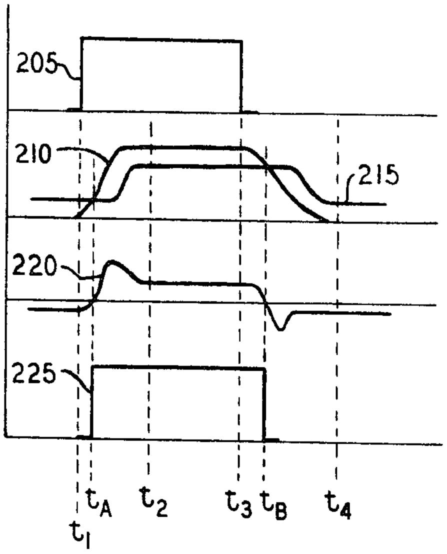
FIG. 2 shows waveforms useful in describing the circuit of FIG. 1.

The signal at the junction of leads 105 and 106 is shown in waveform 210 in FIG. 2. This waveform is identical in shape to the waveform received in response to the originally transmitted pulse signal shown in waveform 205 but is distorted by transmission line 101. Delay 110 including inductor 107 and capacitor 109, as is well known in the art, operates to delay an input signal for a predetermined time. The output of delay 110, at the junction between inductor 107 and capacitor 109, is a signal delayed from waveform 210 by a small amount but having the same voltage levels and shape as waveform 210. The voltage that would be at point 120 due to source 115 alone is more positive than the lower voltage state at the output of delay 110. When the delayed signal is in its lower voltage state, current flows from voltage source 115 through resistor 117 and diode 113. The conduction of diode 113 in turn causes a voltage drop to appear across diode 113 in the positive direction so that the voltage level at point 120 is displaced from the voltage at the output of delay 110 by this voltage drop.

When the signal at delay 110 output is at its higher voltage state, diode 111 conducts. This is so because the potential that would be at point 120 due to source 115 is below that of the higher voltage state. The voltage drop across diode 111 displaces the signal at point 120 in the negative direction from the output of delay 110. The delayed and displaced signal at point 120 is shown on waveform 215. This signal is compressed with respect to the signal of waveform 210 by the action of diodes 111 and 113.

Resistors 121 and 123 form a voltage divider which attenuates the signal from point 120 prior to its application to input terminal 134. Resistors 125 and 127 are appropriately selected so that the directly coupled pulse from amplifier 103 applied to input terminal 133 is attenuated by an identical amount. Thus the inputs at terminals 133 and 134 are of the same shape as those of waveforms 210 and 215. Amplifier 130 operates to compare the signals at input terminals 133 and 134. It is to be understood that other comparator circuits known in the art may also be used and that the signal applied to terminal 134 provides the threshold points for the reshaping of the signal applied to terminal 133.

Prior to time $t_1$ in FIG. 2, waveform 215 is positive with respect to waveform 210 so that the voltage difference from terminal 133 to terminal 134 is negative. This difference between the directly coupled, and delayed and offset signals is shown in waveform 220 prior to $t_1$. The negative voltage of waveform 220 operates to put amplifier 130 in a relatively low voltage state as shown in waveform 225. Between $t_2$ and $t_3$, waveform 210 is more positive than waveform 215 so that the difference signal shown in waveform 220 is positive. This puts amplifier 130 in a relatively high voltage state.

At time $t_A$, waveform 210 crosses over delayed and shifted waveform 215 and the difference between the signals on terminals 133 and 134 reverses polarity. Shortly after time $t_A$, waveform 210 is more positive than waveform 215 so that the difference signal on waveform 220 is positive. This causes a sharp transition in the amplifier output voltage shown on waveform 225. In like manner, the two input waveforms to amplifier 130 cross over at time $t_B$ so that the voltage of waveform 220 reverses polarity and becomes negative. At this time the output of amplifier 130 changes rapidly to its lower level state. Thus, at each polarity reversal of the difference in signals at the input terminals of amplifier 130, the output of amplifier 130 changes state.

It is to be noted that shunt-connected diodes 111 and 113 offset the voltage levels of the delayed signal only slightly from the output of amplifier 103. The offset voltage levels act as threshold points which control the change of state of amplifier 130. Because of the relatively small offset, the points at which polarity reversals occur are very close to the beginning of the transitions of the incoming pulse signal regardless of the variations in the slope or amplitude of the incoming pulse signals. Therefore the output pulse duration is substantially identical to the pulse duration of the originating pulse signal and the output pulse is substantially identical to the originally transmitted pulse but slightly delayed therefrom.

While the principles of our invention have been described in connection with a specific illustrative embodiment, it is to be understood that this description is made only by way of example. Numerous other arrangements and modifications may be devised by those skilled in the art without departing from the spirit and scope of the invention.

What we claim is:

1. A circuit for reshaping pulse signals comprising a comparator having first and second inputs and operative to alter state in response to each polarity reversal of the difference in signals applied to said first and second inputs, means for applying a pulse signal having higher and lower voltage levels to said first input, and means for applying said pulse signal to said second input comprising means for delaying said pulse signal, and means connected between said delaying means and said second input for compressing the higher and lower voltage levels of said delayed pulse signal.

2. A circuit for reshaping pulse signals according to claim 1 wherein said comparator comprises an amplifier operative in response to each positive going polarity reversal to provide a first voltage level output and operative in response to each negative going polarity reversal to provide a second voltage level output.

3. A circuit for reshaping pulse signals according to claim 1 wherein said voltage level compressing means comprises a diode network having a plurality of diodes for offsetting the higher voltage level of said delayed pulse signal in the negative direction and for offsetting the lower voltage level of said delayed pulse signal in the positive direction.

4. A circuit for reshaping pulse signals according to claim 3 wherein said diode network comprises a pair of oppositely poled shunt-connected diodes and means for biasing said diode pair to a voltage between said higher and said lower voltage levels.

5. A circuit for reshaping pulse signals according to claim 4 wherein one terminal of said diode pair is connected to said delaying means and the other terminal of said diode pair is coupled to said second input, and said biasing means comprising a voltage source for biasing said other terminal to a voltage between said higher and lower voltage levels and resistive means connected between said voltage source and said other terminal.

6. A circuit for reshaping distorted pulse signals comprising means for receiving an input pulse signal from a transmission path, said pulse signal having first and second voltage states, amplifier means having first and second inputs for providing a reshaped output pulse with a transition at each polarity reversal of the difference between a signal applied to said first input and a signal applied to said second input, first means for applying the pulse signal from said receiving means to said first input, second means for delaying said pulse signal and compressing the voltage states of said pulse signal from said receiving means and for applying said delayed and compressed pulse signal to said second input, said second means including a delay and a diode network having a plurality of diodes connected between said delay and said second input for shifting the first voltage state of said delayed pulse signal positively and for shifting the second voltage state of said delayed pulse signal negatively.

7. A circuit for reshaping distorted pulse signals according to claim 6 wherein said diode network comprises first and second oppositely poled shunt-connected diodes, means for rendering said first diode conductive when said delayed pulse signal is in said first voltage state, and means for rendering said second diode conductive when said delayed pulse signal is in said second voltage state.

8. A circuit for reshaping pulse signals comprising means for receiving an input pulse signal having high and low voltage levels from a transmission path, amplifying means having first and second input terminals, said amplifying means providing an output pulse having a predetermined high voltage level when a signal applied to said first terminal is more positive than the signal applied to said second terminal and a predetermined low voltage level when the signal applied to said first terminal is less positive than the signal applied to said second terminal, first means for applying said pulse signal from said receiving means to said first terminal, second means for delaying and compressing said pulse signal from said receiving means and for applying said delayed and compressed pulse signal to said second terminal, said second means comprising a pair of oppositely poled shunt-connected diodes, and means for biasing said diode pair to a reference voltage between said high and low voltage levels.

9. A circuit for reshaping pulse signals comprising a transmission path, a first amplifier for receiving a pulse signal having high and low voltage levels from said path, a second amplifier having first and second inputs for amplifying the voltage difference between said first and second terminals, said second amplifier being operative in a first state in response to a positive voltage difference from said first input to said second input and being operative in a second state in response to a negative voltage difference from said first input to said second input, a first network connected from said first amplifier to said first input for applying the first amplifier output pulse signal to said first input, a delay network connected to said first amplifier output, a pair of oppositely poled shunt-connected diodes connected between said delay network and a second network, said second network being connected to said second input, a reference voltage source for biasing the junction of said diodes with said second network to a voltage between said high and low voltage levels, and a resistor connected between said reference voltage source and said junction.